UNITED STATES PATENT OFFICE.

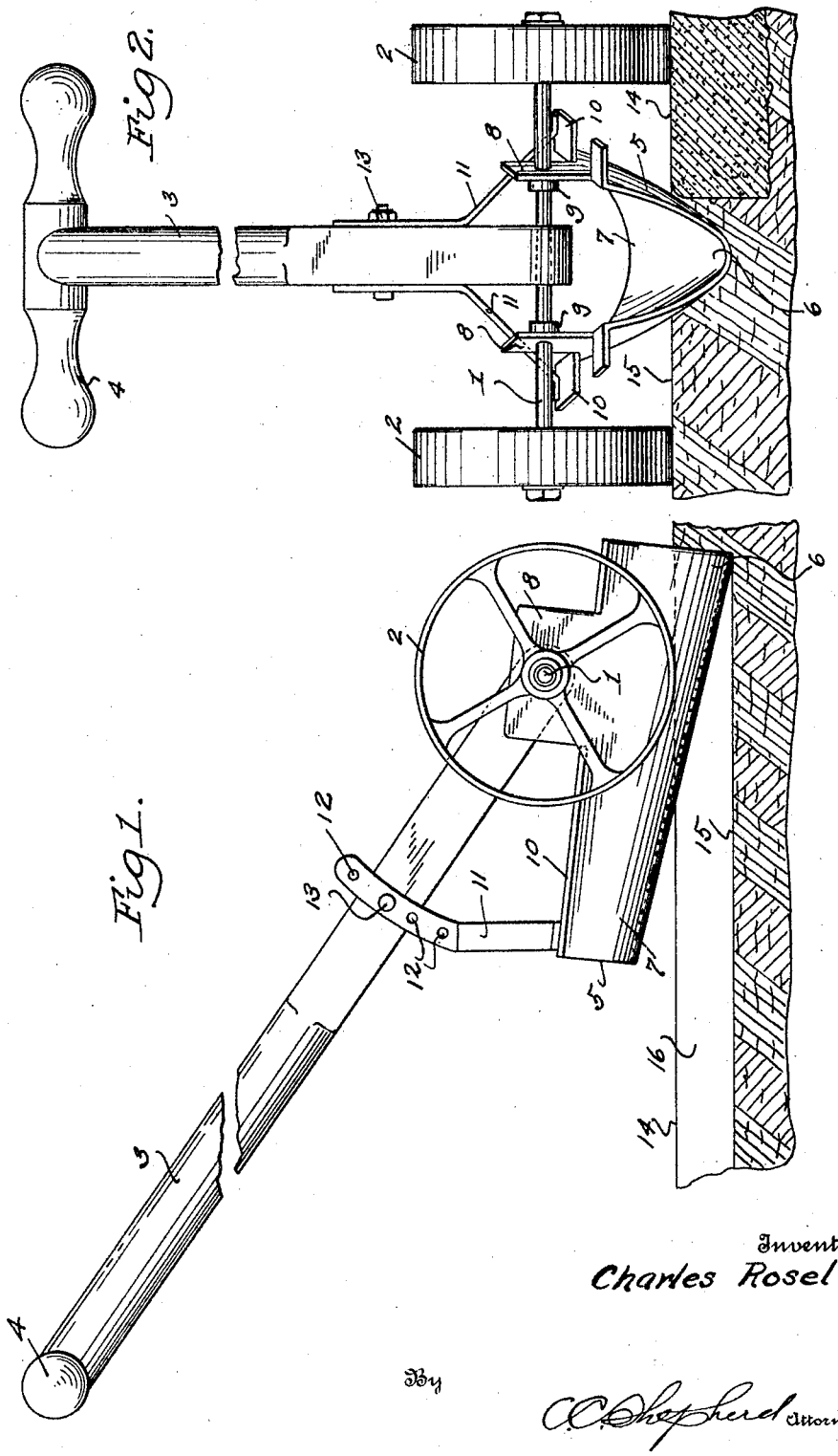

CHARLES ROSEL, OF NEWARK, OHIO.

LAWN-EDGING MACHINE.

1,400,627.  Specification of Letters Patent.  Patented Dec. 20, 1921.

Application filed September 27, 1920. Serial No. 413,134.

*To all whom it may concern:*

Be it known that CHARLES ROSEL, a citizen of the United States, residing at Newark, in the county of Licking and State of Ohio, has invented certain new and useful Improvements in Lawn-Edging Machines, of which the following is a specification.

This invention relates to a portable lawn edging machine, and has for its primary object to provide an efficient, simple and practical device for conveniently producing scooped edges around the boundaries of a lawn, whereby the edges of a lawn adjoining a walk or other similar paved premises will present a neat and attractive appearance by preventing the adjoining edges of said lawn and paved walk from overlapping or presenting an untidy straggling appearance.

The present invention, therefore, aims to produce a lawn edging device which will embody features of construction capable of quickly and easily producing ditches of the character stated and which will enable this work to be done in a simple and convenient manner and with precision in proportions and a pleasing finished appearance.

For a further understanding of the invention, reference is to be had to the following description, and to the accompanying drawing, in which similar characters of reference denote like and corresponding parts.

In said drawing:

Figure 1 is a side elevation of the improved lawn edging tool comprising the present invention, and, Fig. 2 is a front elevation thereof.

As shown in the accompanying drawing, my improved lawn edging tool consists of an axle 1 to the ends of which are rotatably connected land or ground wheels 2. Centrally of the axle 1 there is provided the lower end of an upwardly and angularly extending handle bar 3, which has its upper end provided with the usual gripping handles 4, by means of which the tool may be grasped and the necessary pressures applied thereto. In connection with this structure, I employ a mechanical shovel or scoop 5, which is substantially U shaped in transverse cross section and is provided with a narrow and deep forward portion 6 and a smooth shallow and transversely widened rear or discharge end 7. This scoop is supported in connection with the axle 1 by providing its sides with upstanding projections 8, which are provided with openings capable of receiving the axle 1, from which latter the scoop as a whole is suspended. The axle may be provided with fixed collars 9, which operate to prevent undue lateral shifting of the scoop longitudinally of the axle 1. It will be observed that the upper edge of the scoop is also provided with laterally extending flanges 10, and to the rear ends of these flanges there is secured the lower portions of a pair of adjusting braces 11, the upper ends of said braces in this instance are provided with a plurality of openings 12, which are arranged to receive a bolt 13, the latter being formed to pass transversely through the handle bar 3 and to be capable of being positioned within any of the openings 12 so as to securely unite the braces 11 in connection with the handle bar.

From the foregoing description, it will be apparent that the present invention provides a device which may be simply and readily used in the process of forming a ditch or other shallow groove around the edge of a lawn. Thus, in operation, the device is so positioned that its traction wheels 2 will operate over the pavement 14 and over a lawn 15, thus enabling the forward earth cutting portions of the scoop to be positioned between the junction of the pavement and said lawn. By controlling the position of the bolt 13 within the brace openings 12, the scoop as a whole may be rocked about its fulcrum provided by the axle 1, in order that the cutting depth of said scoop may be readily varied to suit various depths and conditions, and so that the tool may be accommodated to various kinds of soil. After the scoop has been adjusted to assume the desired cutting angle, the handles 4 are grasped and the machine is propelled forwardly, thus causing the scoop to remove the soil and to effect the formation of the shallow ditches or trenches 16. By reason of the flaring construction of the rearward portion of the scoop, the latter is enabled to readily receive the earth removed by the forward or cutting portion of the scoop and to conduct the earth rearwardly, where it may be permitted to be discharged from the scoop over an extended area, or an area regulated by the width of the rear end of the scoop. Also, by so flaring the rear end 7, the sides of the ditch 16 will be pressed apart or firmly packed to render the same durable and of well finished appearance.

What is claimed is:

In a lawn edging tool, a wheeled axle, a handle projecting upwardly from said axle, a soil cutting scoop of sheet metal construction formed to include a substantially restricted forward portion and a relatively enlarged and laterally flaring rear portion, ears projecting upwardly from the edges of said scoop and apertured to receive said axle whereby said scoop will be pivotally carried by said axle in depending relation with respect thereto, and a fixed member extending upwardly from the rear portion of said scoop and having an adjustable connection with said handle, whereby the cutting positions of said scoop may be adjusted irrespective of movement on the part of the handle.

In testimony whereof I affix my signature.

CHARLES ROSEL.